United States Patent

[11] 3,609,131

| [72] | Inventors | Philippe Lalet<br>Orthez;<br>Guy Tsouladze, Pau; Henri Fassy, Orthez, all of France |
|---|---|---|
| [21] | Appl. No. | 786,388 |
| [22] | Filed | Dec. 23, 1968 |
| [45] | Patented | Sept. 28, 1971 |
| [73] | Assignee | Societe Anonyme dite: Societe Nationale Des Petroles D'Aquitaine<br>Courbevole, France |
| [32] | Priority | Dec. 29, 1967 |
| [33] | | France |
| [31] | | 134,501 |

[54] COPOLYMERS OF VINYL CHLORIDE AND OLEFINS AND PROCESSES FOR THEIR PREPARATION
6 Claims, No Drawings

[52] U.S. Cl. .................................................. 260/87.5 C, 260/80.70
[51] Int. Cl. .................................................. C08f 3/30, C09f 3/00
[50] Field of Search ............................................. 260/87.5 E, 87.5 D, 80.78

[56] References Cited
FOREIGN PATENTS
1,925,367  11/1967  Japan ........................... 260/87.5

*Primary Examiner*—Joseph L. Schofer
*Assistant Examiner*—J. A. Donahue, Jr.
*Attorney*—Bacon & Thomas ABSTRACT: Vinyl resins are prepared by copolymerizing vinyl chloride in the presence of at least one branched olefin having at least seven carbon atoms. The use of $C_7$, $C_9$, $C_{12}$ and $C_{15}$ olefinic isomers is specifically described. The process is preferably performed in aqueous suspension between 30° C. and 80° C. and at a pressure less than 20 atmospheres.

The new copolymers have good properties of shock resistance, working and solubility and are of application in fields where vinyl chloride resins are used.

COPOLYMERS OF VINYL CHLORIDE AND OLEFINS AND PROCESSES FOR THEIR PREPARATION

BACKGROUND OF INVENTION

The invention is in the field of vinyl chloride polymers. The vinyl chloride resins at present known have properties which allow them to be used in many fields. However, the thermal stability, suitability for extrusion and solubility of these products are mediocre. They are therefore excluded from certain applications.

Up to the present attempts have been made to overcome these difficulties to by incorporating plasticizers or stabilizers in the resins constituted by homopolymers of vinyl chloride, by preparing homopolymers of low molecular weight, or by copolymerizing vinyl chloride with other vinyl monomers such as vinyl acetate, alkyl acrylates, dialkyl fumarates or alkylvinyl esters.

These measures have in general allowed one or other of the unsatisfactory properties to be improved but they affect the others unfavorably.

SUMMARY OF INVENTION polymerization present invention relates to new vinyl resins obtained by copolymerizing vinyl chloride with certain olefins or mixtures of olefins. It is also concerned with polymerisation processes used for preparing these new copolymers.

It is an object of the present invention to provide new vinyl chloride copolymers having improved properties, above all insofar as concerns the characteristics of thermal stability, resistance to shock, capability of being worked and solubility without the other properties being modified unfavorably. This permits the fields of application of resins based on vinyl chloride to be considerably extended.

The copolymers according to the present invention are obtained by the copolymerization of vinyl chloride in the presence of branched olefins having a number of carbon atoms greater than or equal to $C_7$ and preferably less than $C_{20}$.

These branched olefins can be used alone or in admixture with quantities, usually minor quantities, of any olefins or other monomers.

In the polymer formed the vinyl chloride predominates, the content of vinyl chloride in the polymer being in general greater than 80 percent by weight in the copolymer and preferably greater than or equal to 90 percent. In practice the products which allow of the most important applications contain 92 to 98 percent of vinyl chloride and 2 to 8 percent by weight of olefins relatively to the copolymer.

In the process according to the present invention vinyl chloride is polymerized in the presence of branched olefins having the following formula:

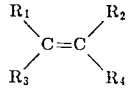

in which $R_1$ and $R_2$ must be alkyl groups while $R_3$ and $R_4$ can be either alkyl groups or hydrogen atoms.

The number of carbon atoms is greater than or equal to $C_7$ and preferably less than $C_{20}$. Particularly useful products may be obtained with olefins in which the number of carbon atoms is from $C_9$ to $C_{15}$. The olefins having 12 and 15 carbon atoms are those which can be most easily used in practice.

In accordance with one feature of the present invention, vinyl chloride is polymerized with a mixture of monomers comprising at least one olefin referred to below of the formula:

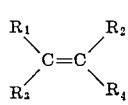

in which $R_1$ and $R_2$ must be alkyl groups while $R_3$ and $R_4$ are either alkyl groups or hydrogen atoms.

The other monomer or monomers is or are preferable olefins of the same type or that they can be different olefins such as, for example, propylene, butene, 3-methyl-1-hexene etc. In accordance with one particularly important embodiment of the invention, vinyl chloride is polymerized in the presence of a mixture of olefins having the same number of carbon atoms, that is to say in the presence of a mixture of olefin isomers. Naturally at least one of these olefins corresponds to the formula referred to above. The mixtures which can be used in carrying out the present invention are mixtures of the $C_7$, $C_9$, $C_{12}$ or $C_{15}$ olefin isomers. The olefins or mixtures of olefins used as comonomers can be obtained in the following manner; the gaseous mixtures obtained by the cracking of hydrocarbons are subjected to oligomerization that is to say to a slight degree of polymerization. Then the products obtained are distilled. The fractions can be separated into four different parts which are called in the industry, heptenes, tripropylene, tetrapropylene and pentapropylene. In actual fact the first fraction is constituted by a mixture of $C_7$ olefins, the second by a mixture of $C_9$ olefins, the third by a mixture of $C_{12}$ olefins and the fourth by a mixture of $C_{15}$ olefins.

The initial mixture which is oligomerized is often constituted by a major proportion of propylene and a little butene. Heptene is obtained by the addition of butene to propylene while the $C_9$, $C_{12}$ and $C_{15}$ compounds are obtained by the oligomerization of propylene.

The names compositions to these mixtures correspond neither to a fixed chemical definition nor to a precise chemical composition. They are mixtures of olefin isomers of the same molecular mass but in varying proportions. By way of example, the compositions of certain comonomers used for carrying out the invention will be given.

The heptene used contained: 13 percent of the olefin of the formula $CHR=CHR$, 11 percent of the olefin of the formula $CH_2=CR_{bu'}$ 54 percent of the olefin of the formula $CHR=CR_2$ and 22 percent of the olefin of the formula $CR_2=CR_2$. Of course, all these olefins have seven carbon atoms and R is an alkyl radical.

The tripropylene used contained: 15 percent of the olefin of the formula $CHR=CHR$, 8 percent of the olefin of the formula $CH_2=CR_{bu'}$ 35 percent of the olefin of the formula $CHR=CR_2$, and 42 percent of the olefin of the formula $CR_2=CR_2$. Of course, all these olefins have nine carbon atoms and R is an alkyl radical.

The tetrapropylene used contained: 12 percent of the olefin of the formula $CHR=CHR$, 7 percent of the olefin of the formula $CH_2=CR_2$, 26 percent of the olefin of the formula $CHR=CR_2$, and 55 percent of the olefin of the formula $CR_2=CR_{b}$. Of course, all these olefins have 12 carbon atoms and R is an alkyl radical.

The mixtures of olefin monomers referred to above are given by way of example and, although they form part of the present invention, they do not limit it in any way.

Moreover, it will be clear that the mixtures of this composition or of different compositions can be obtained by processes other than that which has been described above.

In carrying out the polymerization process according to the invention, the olefin monomers are in a minor proportion in the reaction mixture relatively to the vinyl chloride. In general a maximum of 20 percent of olefins is used for 80 percent vinyl chloride and preferably less than 10 percent olefins.

The process can be carried out in accordance with the known techniques for polymerizing vinyl chloride. The reaction can be carried out in the mass, in solution, in emulsion or in suspension. Preferably a process for polymerization in aqueous suspension is used.

One of the characteristics of the invention is that copolymers can be prepared with a good yield by a process which does not necessitate the use of elevated pressure and temperature and which in consequence can be carried out without difficulty in conventional polymerization apparatus. The copolymers can be prepared using pressures less than 20 atmospheres and temperatures which are generally between 30° and 80° C. Preferably the pressure is between 4 and 14 atmospheres and the temperature is between 40° and 70° C.

The most convenient procedure for carrying out the process of the present invention consists in polymerizing the monomers in aqueous suspension in the conditions of temperature and pressure given above and in the presence of radical type catalysts, surface-active agents, suspension agents and a buffering agent.

Among the suspension agents which may be used, mention may be made of, for example, polyvinyl alcohol, methylcellulose and hydroxypropylcellulose. As surface-active agents there can be used sulfonates or sulphosuccinates. As buffering agent there can be added, for example, disodium phosphate or sodium acetate.

The catalysts used may be peroxides or peresters; mention may be made by way of example of the following catalysts; lauryl peroxide, benzyl peroxide, azo-bis-isobutyronitrile, alkyl perpivalates, acetycyclohexane sulphonyl, chlorobenzyl peroxide, alkyl perioxydicarbonates or combinations of these catalysts with one another or with other free radical type catalysts.

In carrying out the polymerization there is in general firstly prepared a solution of the surface-active agents and of the suspension agents, then the buffering agent is dissolved. Then the polymerization vessel is charged with the solution; then after the vessel has been purged for example with an inert gas, the monomers are introduced.

Either the whole of the vinyl chloride can be added at the commencement of the reaction or it can be added during the reaction in a continuous or intermittent manner, controlling the introduction thereof in such a way that there will always be some vinyl chloride monomer in the reaction vessel.

Alternately, the polymerization can be carried out in two stages, the first stage being carried out at a polymerization temperature less than the second stage.

It is also possible to carry out polymerization by progressively increasing the temperature instead of maintaining it at one or several fixed predetermined values.

The substances according to the present invention, and in particular the substances obtained by the processes described above, possess improved properties which render them useful in many industrial fields.

Mention can be made of, for example; the manufacture of hollow bodies for extrusion, of rigid, semirigid and flexible films, of members for injection of tiles for covering the ground, of discs, of adhesives, of inks and of polymeric plasticizers for high molecular mass polyvinyl chloride. They could also be used for the manufacture of expanded polyvinyl chloride.

DESCRIPTION OF PREFERRED EMBODIMENTS

The following Examples are given to facilitate better understanding of the invention. They do not limit it in any way.

EXAMPLE I

Into a double walled coated steel reaction vessel there are introduced successively:
80 kg. of demineralized water
3 litres of a 25 g./1 aqueous solution of polyvinyl alcohol having a degree of saponification of 80 percent and a viscosity of 35 centipoises when measures in 4 percent solution in water at 20° C.
600 cc. of an 80/g./1 solution of disodium phosphate.
1.8 kg. of a mixture of $C_9$ isomers (tripropylene) 70 g. of lauryl peroxide.

The reaction vessel is closed and agitation is commenced at a speed of 220 revolutions per minute.

The vessel is evacuated and then 45 kg. of vinyl chloride is introduced. The temperature of the suspension in the vessel is raised to 64° C. The pressure is maintained at about 10 atmosphere.

After 12 hours of polymerization one obtains 36 kg. of a white powder looking like ordinary polyvinyl chloride which is dried in a drying cabinet for 15 hours at 60° C.

The substance obtained has a viscosity index of 61 (standard ISO R 174) and a percentage of tripropylene of 2.1 measured by the amount of chlorine.

This substance is characterized by a surprising fluidity and thermal stability as well as by excellent resistance to shock.

EXAMPLE II

Under the same operating conditions as example I this time there is introduced 2.7 kg. of a mixture of $C_9$ isomers (tripropylene). One obtains 30 kg. of a substance having a viscosity index of 51 (standard ISO R 174). The percentage of tripropylene in the substance obtained is 3.2. This substance is characterized by good thermal stability, excellent fluidity and enhanced solubility in numerous solvents.

EXAMPLES III, IV AND V

In a series of tests carried out under the same conditions as examples I, 1.8 kg. of the following monomers is introduced:

|  | Example | | |
|---|---|---|---|
|  | III | IV | V |
| Comonomers | Tetra-propylene | Penta-propylene | Heptenes |
| Degree of conversion, percent | 70 | 80 | 70 |
| Viscosity index ISO R 174 | 62 | 70 | 50 |
| Percent of comonomers in the final product | 2 | 2.2 | 1.9 |

All the substances obtained exhibit good thermal stability, good resistance to shock and excellent fluidity.

EXAMPLE VI

Under the same operating conditions as in example I, but using 70 g. of tert. butyl perpivalate and 1 kg. of tetrapropylene, polymerization is carried out for 11 hours. One obtains a resin having a viscosity index of 70 with a yield of 80 percent.

This resin has a good thermal stability and an excellent fluidity and resistance to shock.

We claim:
1. A copolymer of vinyl chloride and one or more olefins wherein:
   a. the olefin content of the copolymer is from 2 percent to 8 percent;
   b. at least one of the olefins contains 9 to 15 carbon atoms and is of the formula

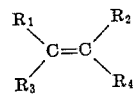

wherein $R_1$, $R_2$, $R_3$, and $R_4$ are each alkyl groups; and
   d. the olefin in (b) represents at least 40 percent of the olefin mixture.

2. A copolymer according to claim 1 containing a mixture of olefin isomers containing 9 to 15 carbon atoms of which at least one of the olefins is of the formula

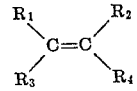

wherein $R_1$, $R_2$, $R_3$, and $R_4$ are each alkyl groups.

3. A copolymer according to claim 2 wherein the mixture of olefin isomers is tripropylene.

4. A copolymer according to claim 2 wherein the mixture of olefin isomers is tetrapropylene.

5. A copolymer according to claim 2 wherein the mixture of olefin isomers is pentapropylene.

6. A process for the preparation of the vinyl chloride copolymers according to claim 11 by the polymerization of vinyl chloride and one or more of the olefins characterized in that the polymerization of vinyl chloride is carried out in an aqueous suspension between 30° and 80° C. at a pressure below 20 atmospheres.